US012638679B2

(12) United States Patent
Meisenholder et al.

(10) Patent No.: US 12,638,679 B2
(45) Date of Patent: **\*May 26, 2026**

(54) EXTENDED FIELD-OF-VIEW CAPTURE OF AUGMENTED REALITY EXPERIENCES

(71) Applicant: Snap Inc., Santa Monica, CA (US)

(72) Inventors: David Meisenholder, Los Angeles, CA (US); Dhritiman Sagar, New York, NY (US); Ilteris Canberk, Marina Del Rey, CA (US); Justin Wilder, Santa Monica, CA (US); Sumant Milind Hanumante, Aliso Viejo, CA (US); James Powderly, Venice, CA (US)

(73) Assignee: Snap Inc., Santa Monica, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/644,985

(22) Filed: Apr. 24, 2024

(65) Prior Publication Data

US 2024/0272432 A1 Aug. 15, 2024

Related U.S. Application Data

(63) Continuation of application No. 17/744,880, filed on May 16, 2022, now Pat. No. 11,982,808.

(Continued)

(51) Int. Cl.
*G02B 27/01* (2006.01)
*G06F 3/01* (2006.01)
(Continued)

(52) U.S. Cl.
CPC ............ *G02B 27/017* (2013.01); *G06F 3/011* (2013.01); *G06T 19/006* (2013.01); *H04N 23/20* (2023.01);
(Continued)

(58) Field of Classification Search
CPC .......... G02B 27/017; G02B 2027/0138; G02B 2027/0178; G02B 2027/0134;
(Continued)

(56) References Cited

U.S. PATENT DOCUMENTS

| | | |
|---|---|---|
| 11,982,808 B2 | 5/2024 | Meisenholder et al. |
| 2012/0188148 A1 | 7/2012 | DeJong |

(Continued)

FOREIGN PATENT DOCUMENTS

| | | |
|---|---|---|
| GB | 2552150 A | 1/2018 |
| KR | 20160027865 A1 | 3/2016 |

(Continued)

OTHER PUBLICATIONS

International Search Report and Written Opinion for International Application No. PCT/US2022/029370, dated Sep. 9, 2022 (Sep. 9, 2022)—10 pages.

(Continued)

*Primary Examiner* — Jeffery A Brier
(74) *Attorney, Agent, or Firm* — CM Law; Stephen J. Weed

(57) ABSTRACT

Augmented reality experiences of a user wearing an electronic eyewear device are captured by at least one camera on a frame of the electronic eyewear device, the at least one camera having a field of view that is larger than a field of view of a display of the electronic eyewear device. An augmented reality feature or object is applied to the captured scene. A photo or video of the augmented reality scene is captured and a first portion of the captured photo or video is displayed in the display. The display is adjusted to display a second portion of the captured photo or video with the augmented reality features as the user moves the user's head to view the second portion of the captured photo or video. The captured photo or video may be transferred to another (Continued)

device for viewing the larger field of view augmented reality image.

20 Claims, 21 Drawing Sheets

Related U.S. Application Data

(60) Provisional application No. 63/190,640, filed on May 19, 2021.

(51) Int. Cl.
  *G06T 19/00*          (2011.01)
  *H04N 23/20*         (2023.01)
(52) U.S. Cl.
  CPC ................ *G02B 2027/0138* (2013.01); *G02B 2027/0178* (2013.01)
(58) Field of Classification Search
  CPC .......... G06F 3/011; G06F 3/012; G06F 1/163; G06F 3/04815; G06T 19/006; H04N 23/20; H04N 2213/001; H04N 13/156; H04N 13/189; H04N 13/239; H04N 13/279; H04N 13/344; H04N 13/383; G06V 10/143; G06V 40/172; G06V 40/20; G06V 20/20
  See application file for complete search history.

(56) References Cited

U.S. PATENT DOCUMENTS

| | | |
|---|---|---|
| 2015/0365581 A1 | 12/2015 | Pryszo et al. |
| 2016/0062557 A1 | 3/2016 | Kim et al. |
| 2016/0323567 A1 | 11/2016 | Matson et al. |
| 2017/0103440 A1 | 4/2017 | Xing et al. |
| 2020/0029050 A1 | 1/2020 | Antunes et al. |
| 2020/0358963 A1 | 11/2020 | Manzari et al. |
| 2021/0125412 A1 | 4/2021 | Paulus, Jr. et al. |
| 2022/0130123 A1 | 4/2022 | Wilczynski et al. |

FOREIGN PATENT DOCUMENTS

| | | |
|---|---|---|
| KR | 20170105617 A1 | 9/2017 |
| KR | 20190107001 A1 | 9/2019 |
| WO | 2018007779 A1 | 1/2018 |
| WO | 2018227424 A1 | 12/2018 |

OTHER PUBLICATIONS

1st European Office Action for EP 22731351.7 dated Sep. 11, 2025, 10 pages.
1st Korean Office Action for KR 10-2023-7043215 dated Feb. 11, 2026, 9 pages (English translation—9 pages).

180B

180D

180B

700

180D

800

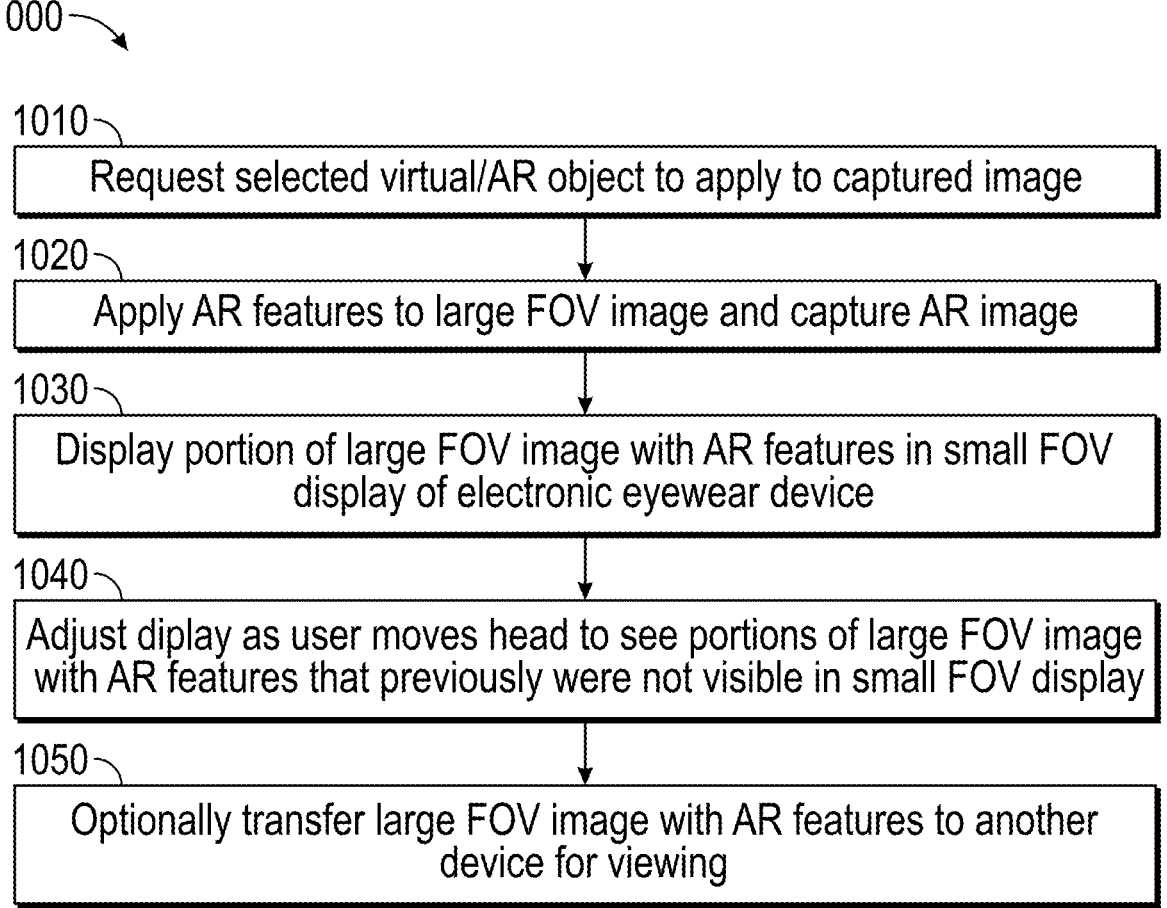

1000

1010
Request selected virtual/AR object to apply to captured image

1020
Apply AR features to large FOV image and capture AR image

1030
Display portion of large FOV image with AR features in small FOV display of electronic eyewear device 1040
Adjust diplay as user moves head to see portions of large FOV image with AR features that previously were not visible in small FOV display 1050
Optionally transfer large FOV image with AR features to another device for viewing

FIG. 10

EXTENDED FIELD-OF-VIEW CAPTURE OF AUGMENTED REALITY EXPERIENCES

CROSS-REFERENCE TO RELATED APPLICATIONS

This application is a Continuation of U.S. application Ser. No. 17/744,880 filed on May 16, 2022, which claims priority to U.S. Provisional Application Ser. No. 63/190,640 filed on May 19, 2021, the contents of both of which are incorporated fully herein by reference.

TECHNICAL FIELD

Examples set forth in the present disclosure relate to image capture for portable electronic devices, including wearable electronic devices such as smart glasses. More particularly, but not by way of limitation, the present disclosure describes techniques for providing an extended field-of-view for image capture of augmented reality experiences for users of an electronic eyewear device.

BACKGROUND

Wearable electronic devices such as electronic eyewear devices may communicate with application programs running on mobile devices such as a user's smartphone and, in some cases, may communicate directly with a server. In either case, the electronic eyewear device may support direct device integration with communication application backend services as well as third-party application programming interfaces (APIs) such as text-to-speech, the SHAZAM PLAYER® app, and the like. Some communication applications provide augmented reality experiences whereby augmented reality objects are provided in the captured real-world image.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 10 illustrates a sample flow chart for creating augmented reality images using large field of view images.

DETAILED DESCRIPTION

Figure 1A:
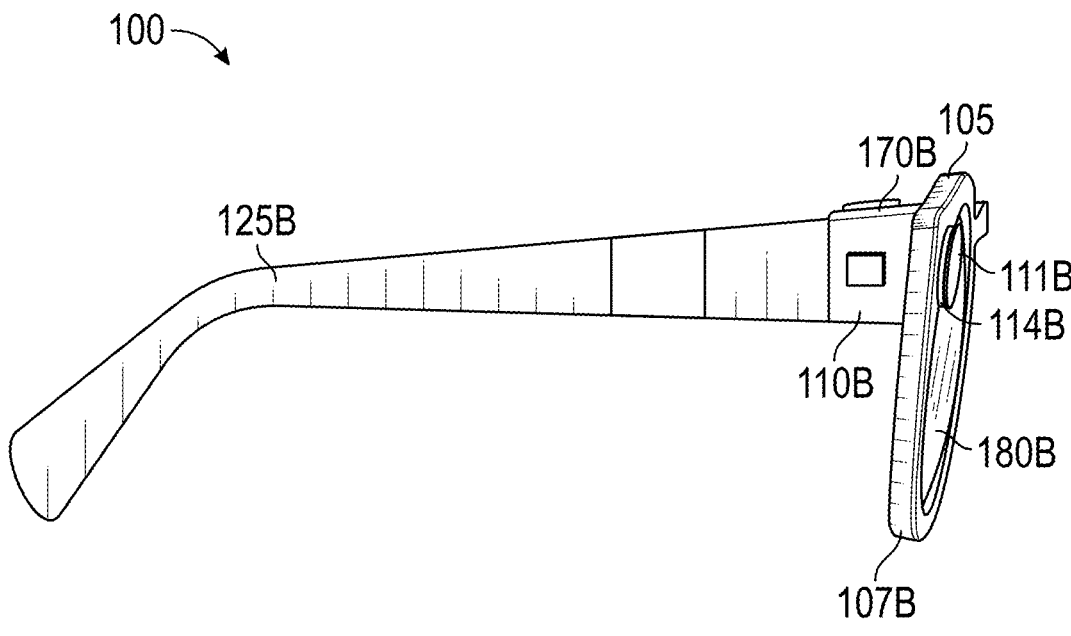
FIG. 1A illustrates a side view of an example hardware configuration of an electronic eyewear device showing a right optical assembly with an image display.

This disclosure is directed to a feature that allows users of electronic eyewear devices to capture videos and photos of the augmented reality (AR) content they have experienced through the electronic eyewear device. Typically, augmented reality experiences are limited by small field-of-view (FOV) displays of the electronic eyewear device whereby at any given time the user cannot see all of the virtual content in which the user is immersed. To address this issue, in sample configurations a wide-angle camera is used to capture the real world environment from near the user's eye position and the state/behavior of any augmented reality feature (e.g., an AR lens) is recorded over the entire wide-angle camera view during capture even for those areas that the user cannot see within the small display FOV. Since the entire field of view is captured, the electronic eyewear device may capture a larger FOV for the real-world environment and re-composite the AR experience beyond what the user saw through the small FOV displays in-the-moment. For example, the user may move through the entire field of view by moving the user's head to view the entire FOV captured by the camera while wearing the electronic eyewear device, or the wide-angle camera view with augmented reality features may be replayed on another device such as the user's mobile phone where a larger FOV may be available.

This disclosure is thus directed to a system and method for capturing augmented reality experiences of a user wearing an electronic eyewear device using at least one camera on a frame of the electronic eyewear device. The at least one camera has a field of view that is larger than a field of view of a display of the electronic eyewear device. An augmented reality feature or object is applied to the captured scene. A photo or video of the augmented reality scene is captured and a first portion of the captured photo or video is displayed in the display. The display is adjusted to display a second portion of the captured photo or video with the augmented reality features as the user moves the user's head to view the second portion of the captured photo or video. The captured photo or video may be transferred to another device for viewing the larger field of view augmented reality image.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device with extended field-of-view capture of augmented reality experiences will be described with respect to FIGS. 1-11.

Figure 2A:
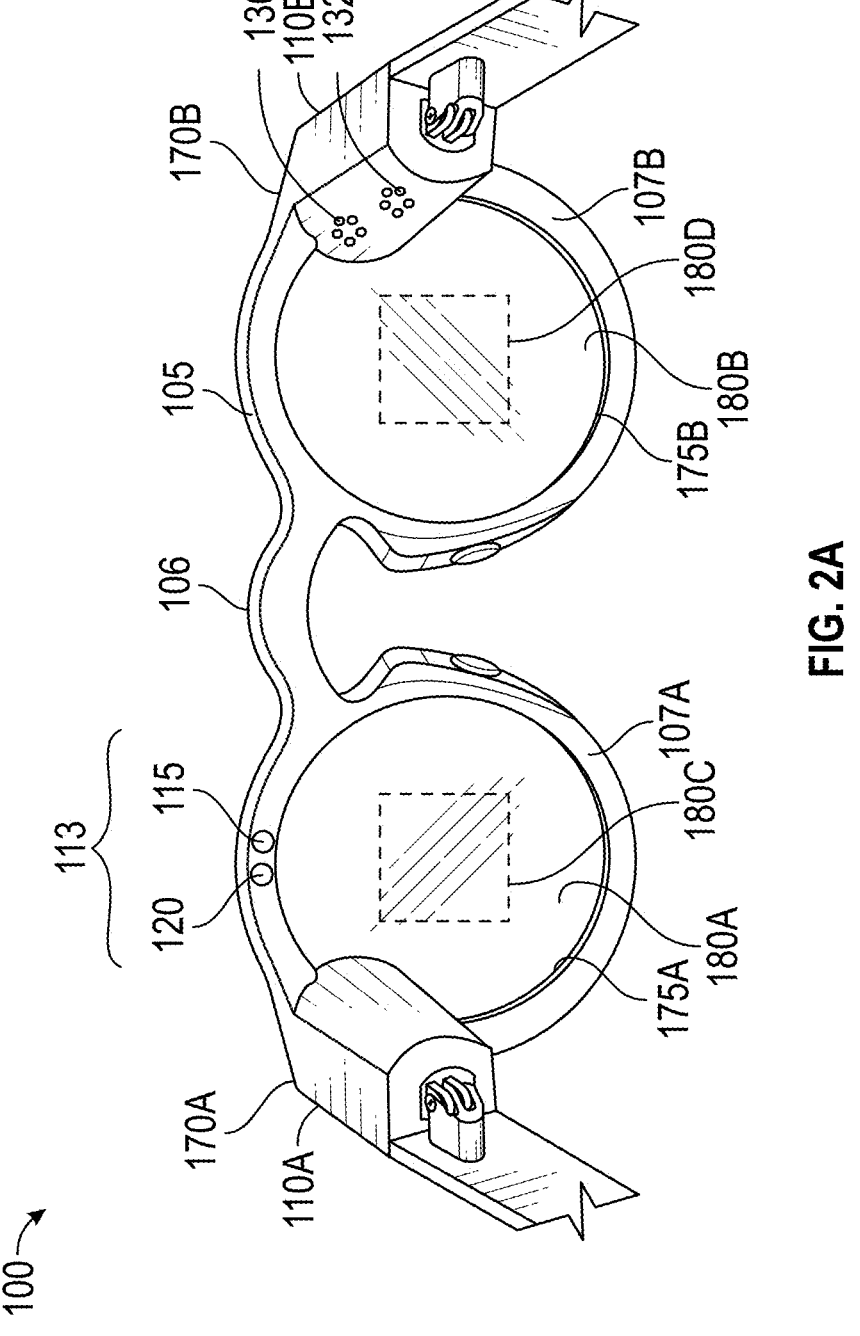
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 5) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 612 of FIG. 6) for digital processing along with a timestamp in which the image of the scene is captured. Image processor 612 may include circuitry to receive signals from the visible light camera 114A-B and to process those signals from the visible light cameras 114A-B into a format suitable for storage in the memory (element 634 of FIG. 6). The timestamp may be added by the image processor 612 or other processor that controls operation of the visible light cameras 114A-B. Visible light cameras 114A-B allow the stereo camera to simulate human binocular vision. Stereo cameras also provide the ability to reproduce three-dimensional images (image 515 of FIG. 5) based on two captured images (elements 558A-B of FIG. 5) from the visible light cameras 114A-B, respectively, having the same timestamp. Such three-dimensional images 515 allow for an immersive life-like experience, e.g., for virtual reality or video gaming. For stereoscopic vision, the pair of images 558A-B may be generated at a given moment in time-one image for each of the left and right visible light cameras 114A-B. When the pair of generated images 558A-B from the frontward facing field of view (FOV) 111A-B of the left and right visible light cameras 114A-B are stitched together (e.g., by the image processor 612), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 632 (FIG. 6) is coupled to the electronic eyewear device 100 and connected to the visible light cameras 114A-B and memory 634 (FIG. 6) accessible to the processor 632, and programming in the memory 634 may be provided in the electronic eyewear device 100 itself.

Figure 1B:
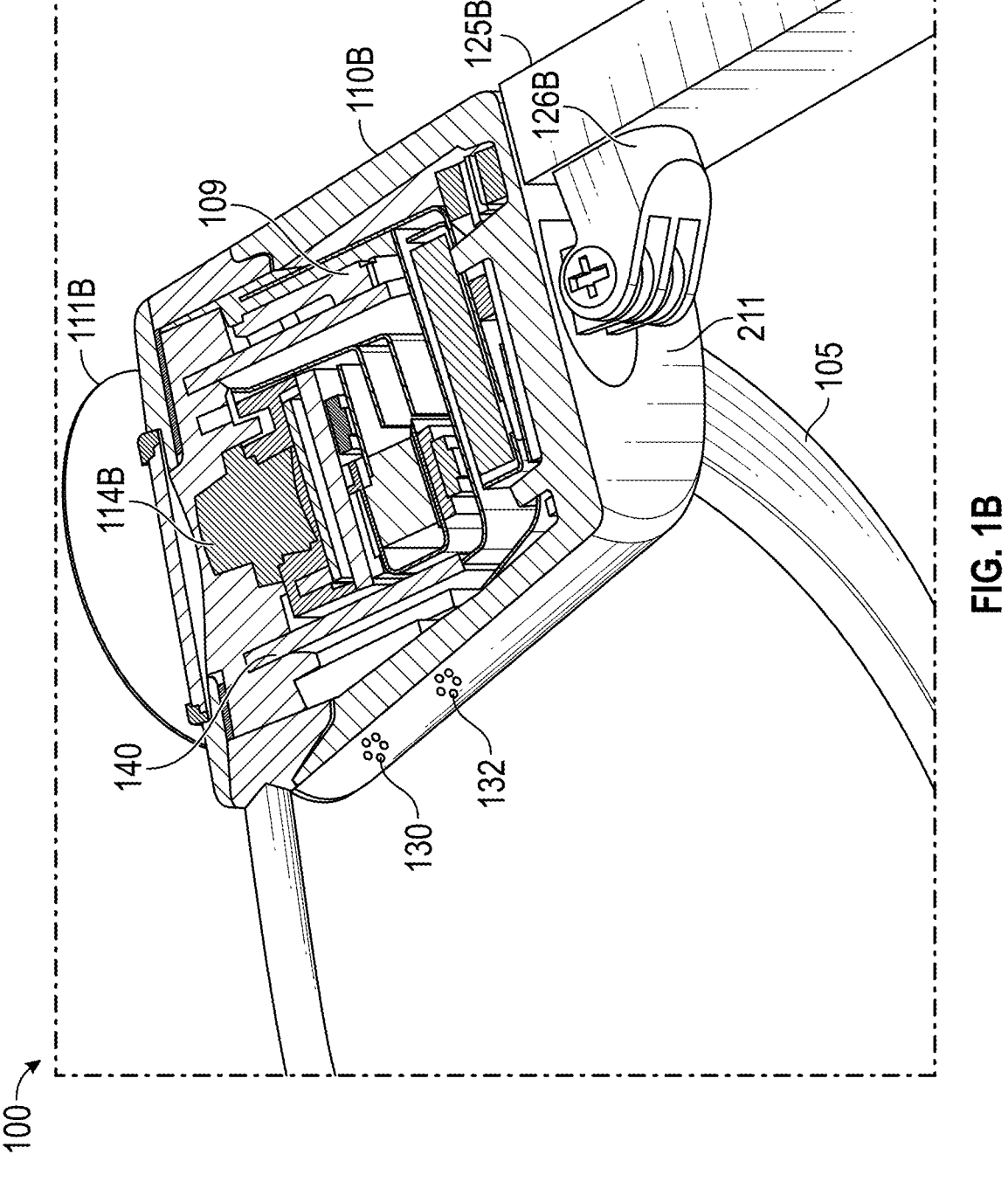
FIG. 1B illustrates a top cross-sectional view of a temple of the electronic eyewear device of FIG. 1A.
Figure 2B:
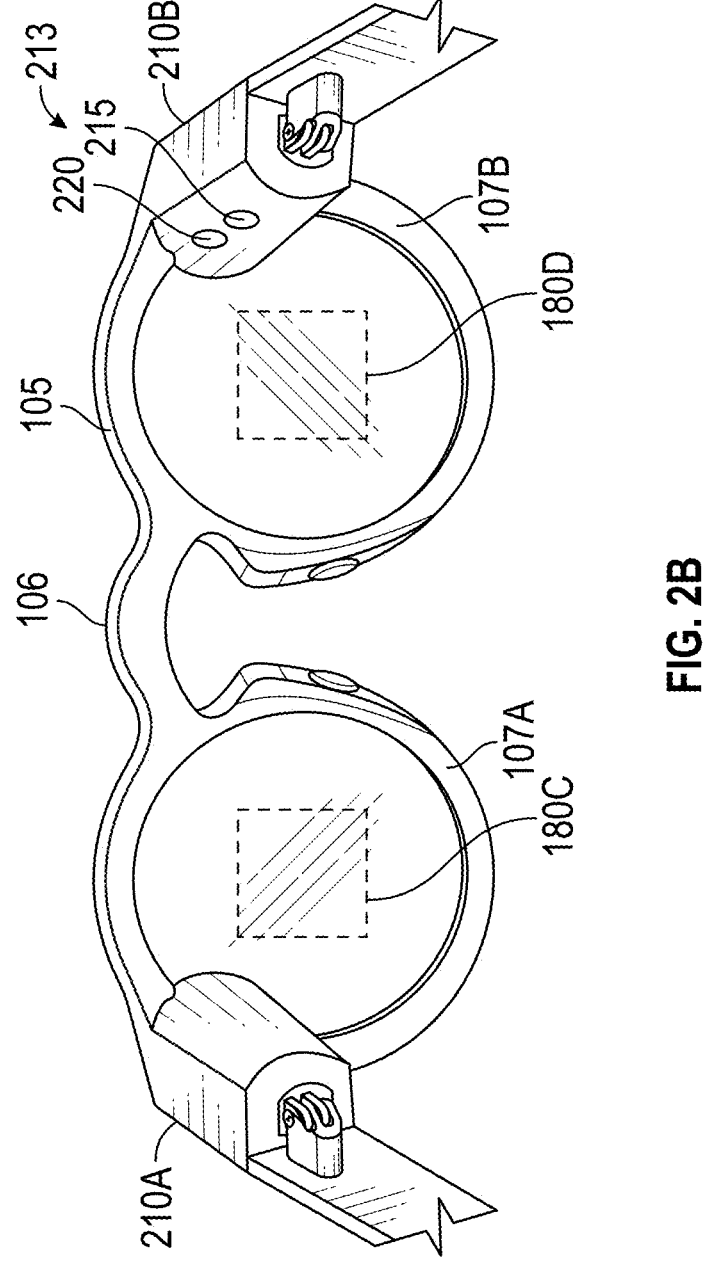
FIG. 2B illustrates a rear view of an example hardware configuration of another electronic eyewear device in an example hardware configuration.
Figure 2C:
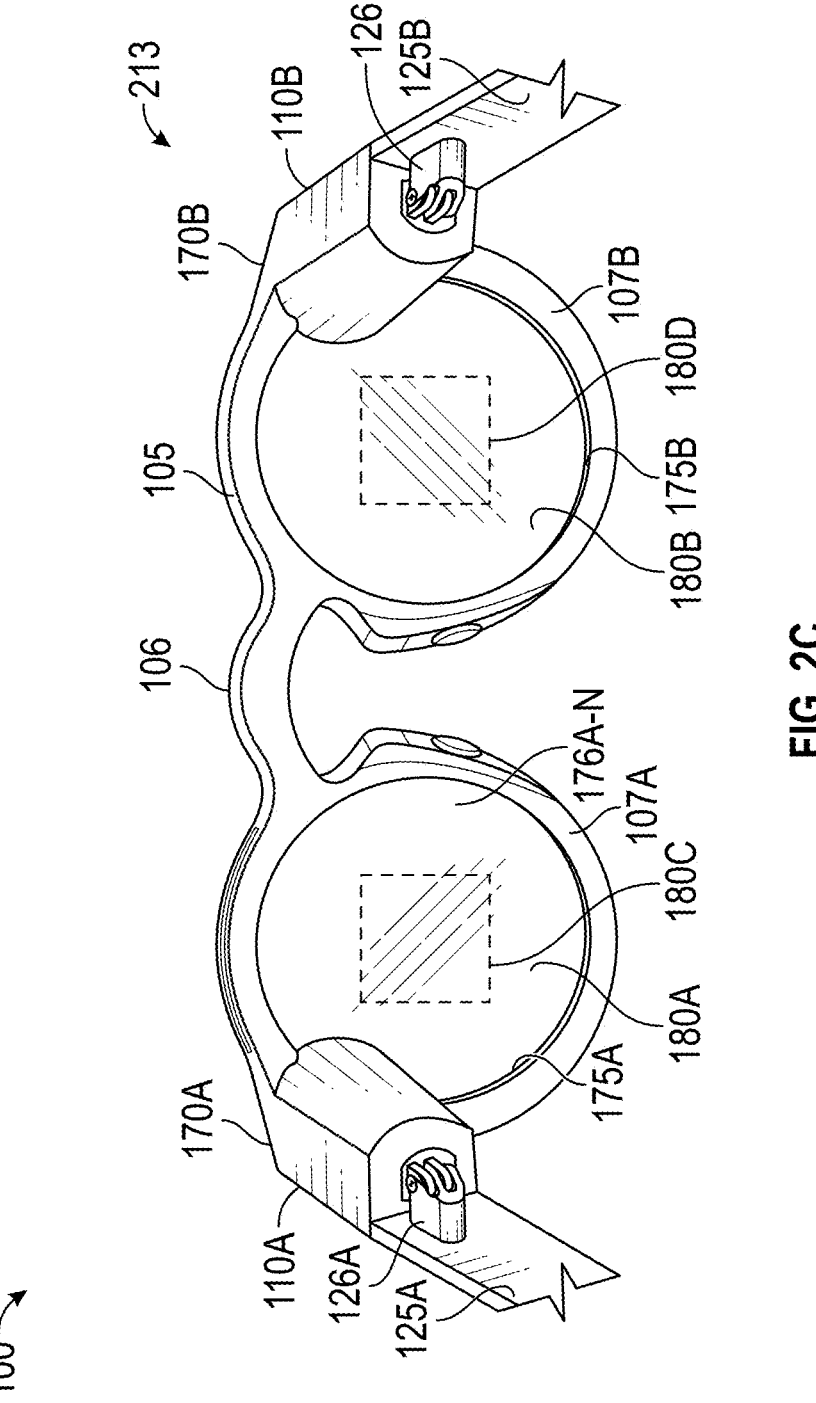
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 642 of FIG. 6) coupled to the see-through image displays 180C-D of optical assembly 180A-B to control the image displays 180C-D of optical assembly 180A-B to present the sequence of displayed images 515, which are described in further detail below. Electronic eyewear device 100 may further include the memory 634 and the processor 632 having access to the image display driver 642 and the memory 634, as well as programming in the memory 634. Execution of the programming by the processor 632 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction.

Execution of the programming by the processor 632 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 632 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 632 may further configure the electronic eyewear device 100 to generate a successive displayed image of the sequence of displayed images based on the field of view adjustment. Execution of the programming by the processor 632 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The left hinge 126A connects the left temple 110A to hinged arm 125A of the electronic eyewear device 100. In some examples, components of the left visible light camera 114A, the flexible PCB 140, or other electrical connectors or contacts may be located on the left temple 110A or the left hinge 126A. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis) or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLU-ETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
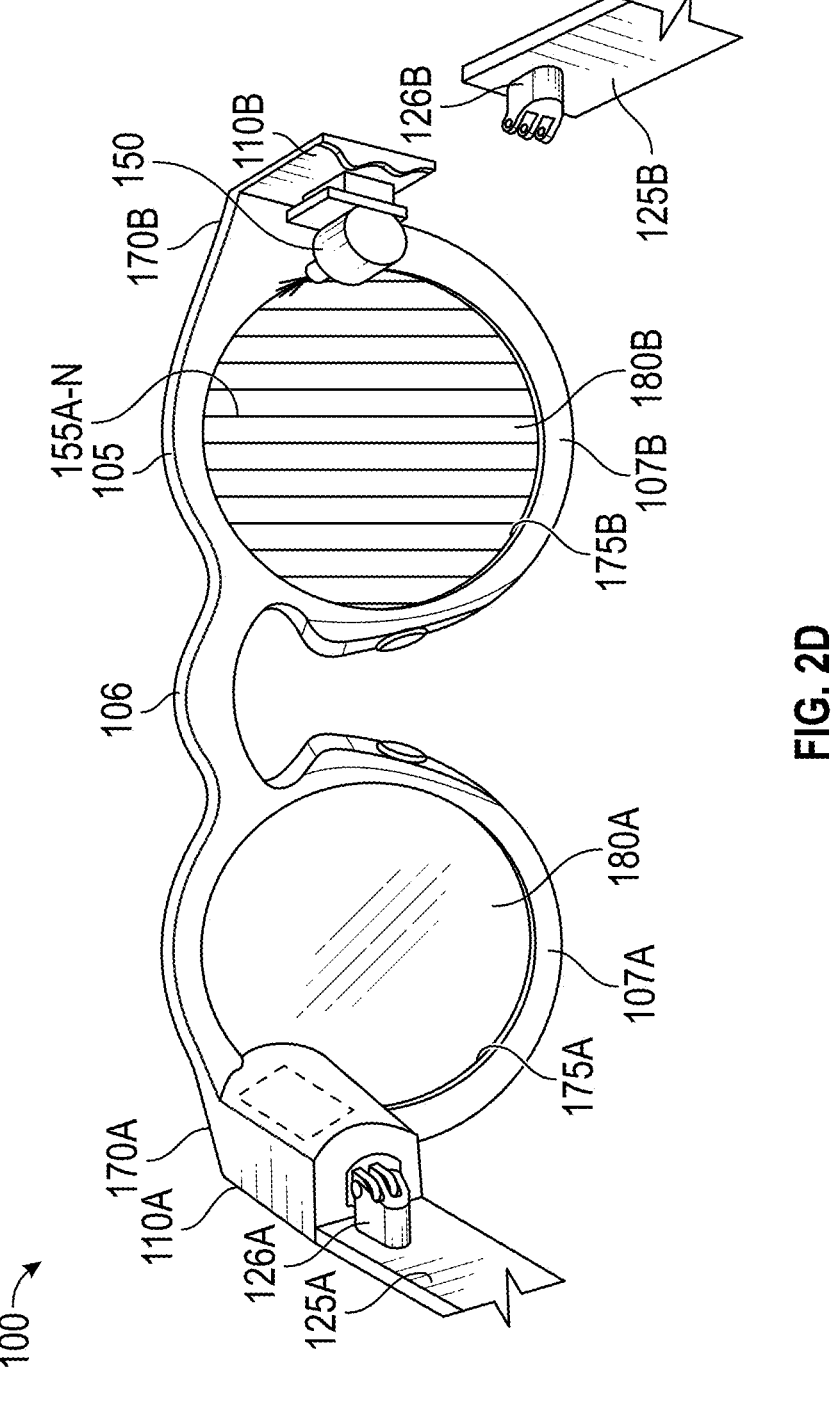

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180A-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips and a projector (not shown) in left temple 110A). The second optical assembly 180B may include the second see-through image display 180D (e.g., a display matrix of FIG. 2C or optical strips 155A-N and a projector 150 in right temple 110B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
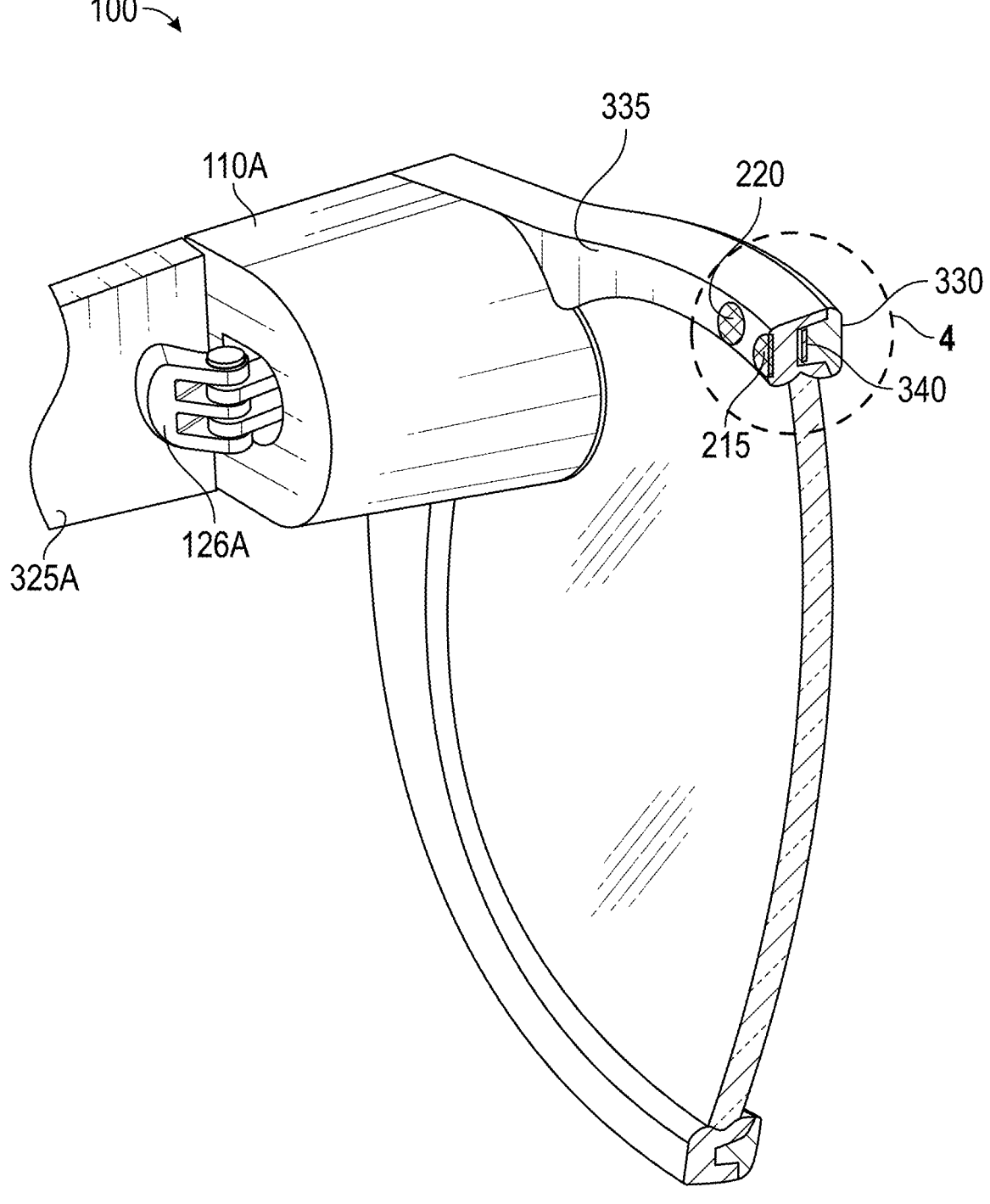
FIG. 3 illustrates a rear perspective view of the electronic eyewear device of FIG. 2A depicting an infrared emitter, an infrared camera, a frame front, a frame back, and a circuit board.

FIG. 3 illustrates a rear perspective view of the electronic eyewear device 100 of FIG. 2A. The electronic eyewear device 100 includes an infrared emitter 215, infrared camera 220, a frame front 330, a frame back 335, and a circuit board 340. It can be seen in FIG. 3 that the upper portion of the left rim of the frame of the electronic eyewear device 100 may include the frame front 330 and the frame back 335. An opening for the infrared emitter 215 is formed on the frame back 335.

As shown in the encircled cross-section 4 in the upper middle portion of the left rim of the frame, a circuit board, which may be a flexible PCB 340, is sandwiched between the frame front 330 and the frame back 335. Also shown in further detail is the attachment of the left temple 110A to the left hinged arm 325A via the left hinge 126A. In some examples, components of the eye movement tracker 213, including the infrared emitter 215, the flexible PCB 340, or other electrical connectors or contacts may be located on the left hinged arm 325A or the left hinge 126A.

Figure 4:
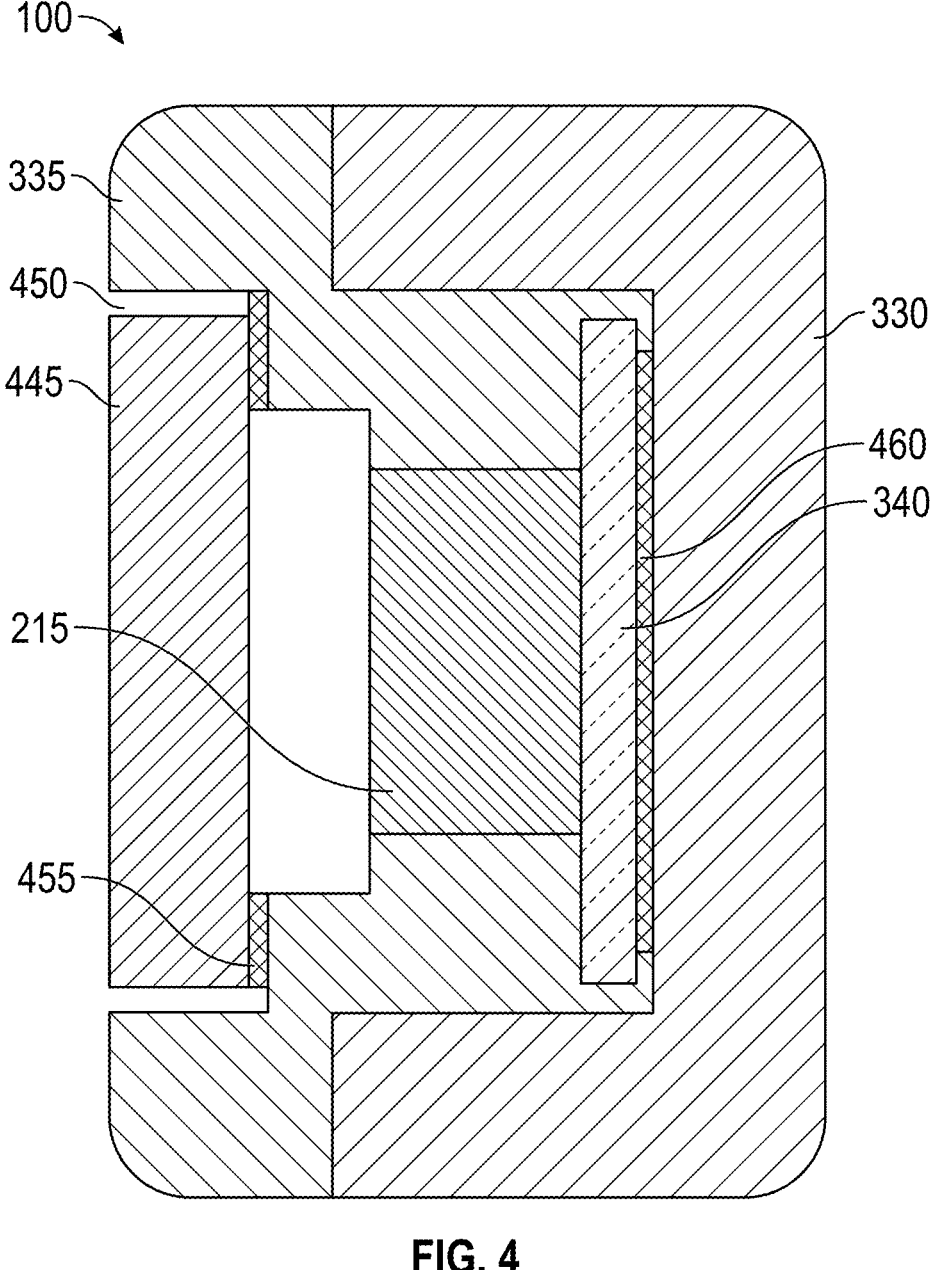
FIG. 4 illustrates a cross-sectional view taken through the infrared emitter and the frame of the electronic eyewear device of FIG. 3.

FIG. 4 is a cross-sectional view through the infrared emitter 215 and the frame corresponding to the encircled cross-section 4 of the electronic eyewear device 100 of FIG. 3. Multiple layers of the electronic eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 may be reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 may include an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling also can be indirect via intervening components.

Figure 5:
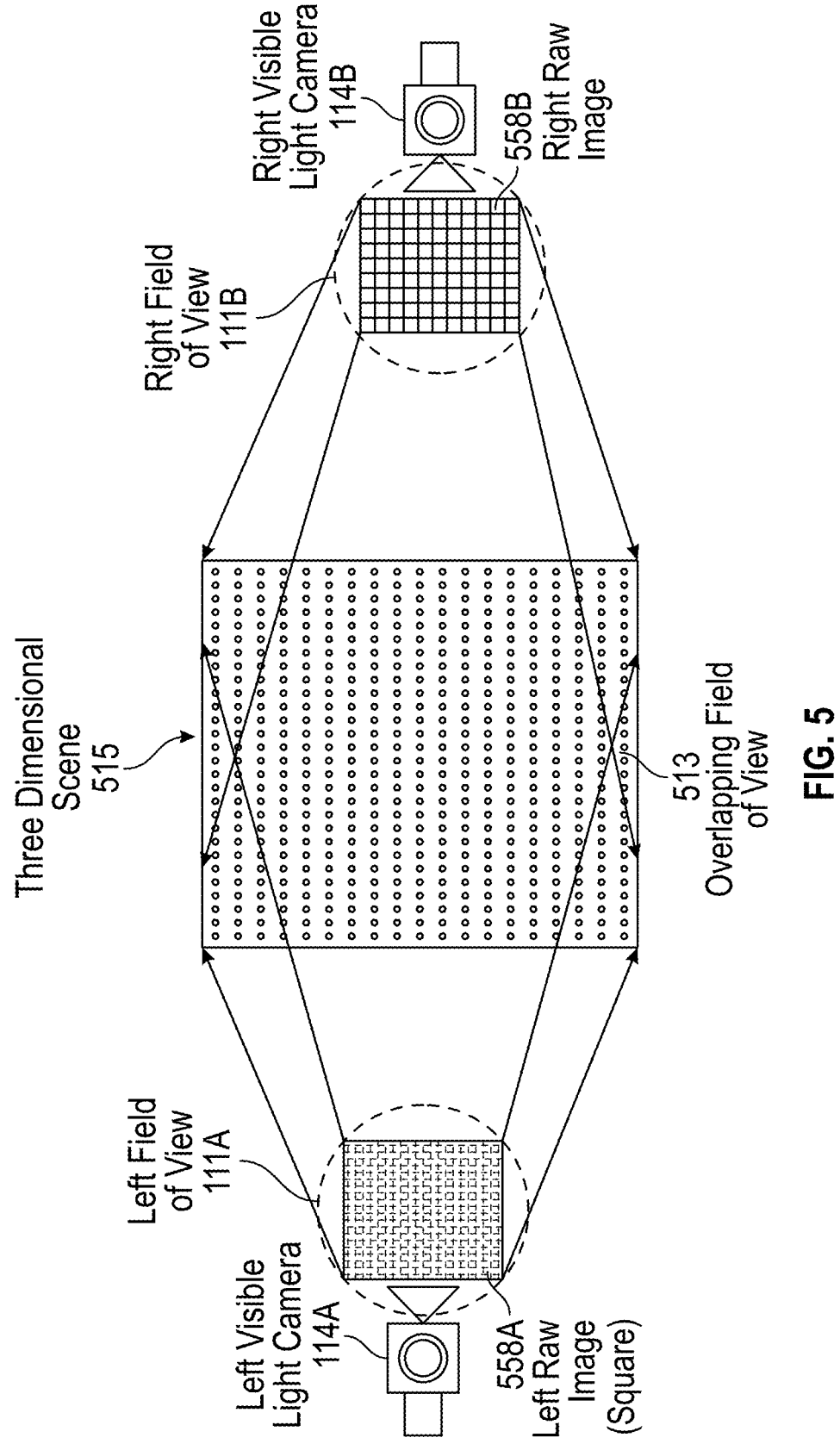
FIG. 5 illustrates an example of visible light captured by the left visible light camera as a left raw image and visible light captured by the right visible light camera as a right raw image.
Figure 6:
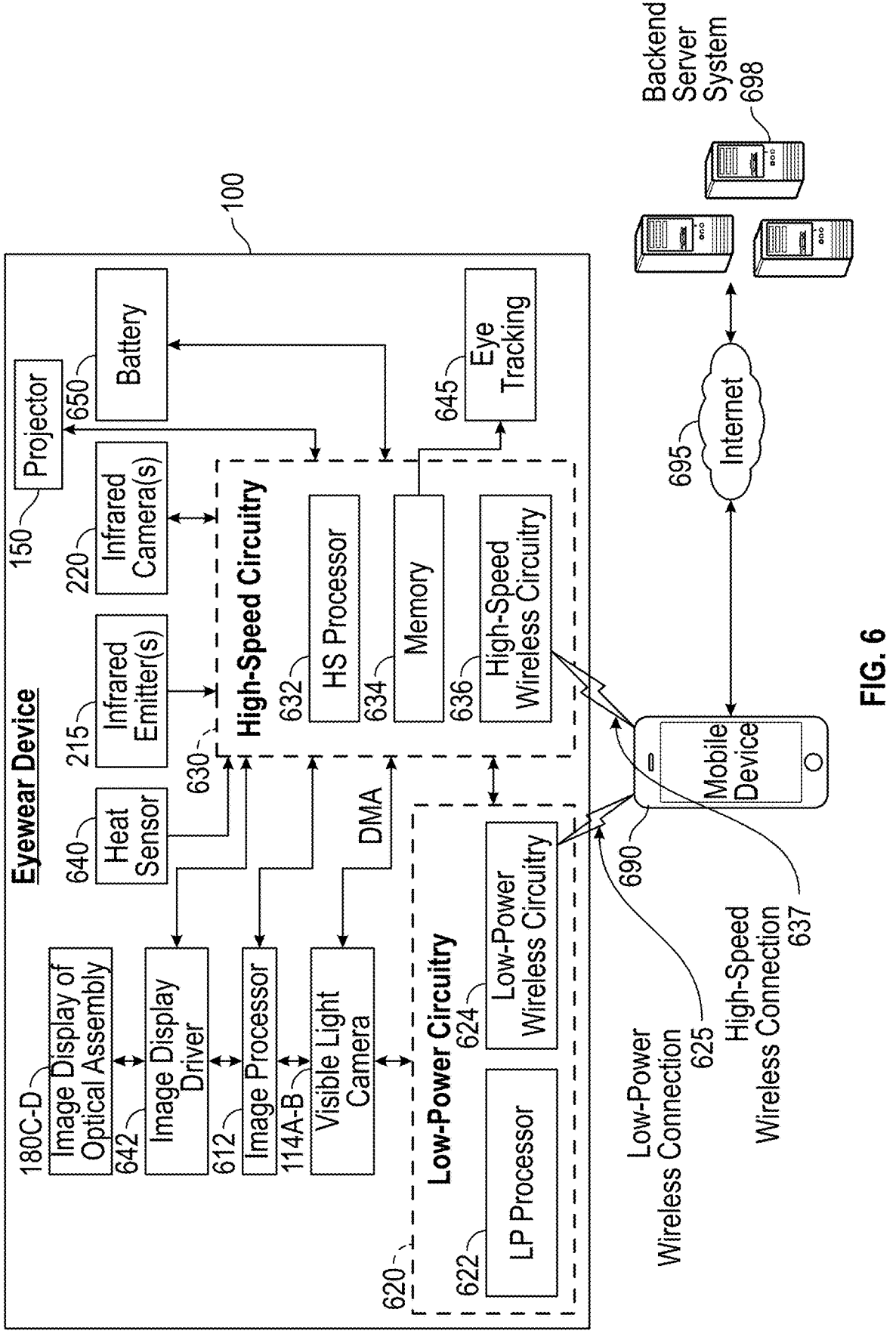
FIG. 6 illustrates a block diagram of electronic components of the electronic eyewear device.

FIG. 5 illustrates an example of capturing visible light with cameras 114A-B. Visible light is captured by the left visible light camera 114A with a round field of view (FOV). 111A. A chosen rectangular left raw image 558A is used for image processing by image processor 612 (FIG. 6). Visible light is also captured by the right visible light camera 114B with a round FOV 111B. A rectangular right raw image 558B chosen by the image processor 612 is used for image processing by processor 612. Based on processing of the left raw image 558A and the right raw image 558B having an overlapping field of view 513, a three-dimensional image 515 of a three-dimensional scene, referred to hereafter as an immersive image, is generated by processor 612 and displayed by displays 180C and 180D and which is viewable by the user.

FIG. 6 illustrates a high-level functional block diagram including example electronic components disposed in electronic eyewear device 100 or 200. The illustrated electronic components include the processor 632, the memory 634, and the see-through image display 180C and 180D.

Memory 634 includes instructions for execution by processor 632 to implement the functionality of electronic eyewear devices 100 and 200, including instructions for processor 632 to control in the image 515. Processor 632 receives power from battery 650 and executes the instructions stored in memory 634, or integrated with the processor 632 on-chip, to perform the functionality of electronic eyewear devices 100 and 200 and to communicate with external devices via wireless connections.

The electronic eyewear devices 100 and 200 may incorporate an eye movement tracker 645 (e.g., shown as infrared emitter 215 and infrared camera 220 in FIG. 2B) and may provide user interface adjustments via a mobile device 690 and a server system 698 connected via various networks. Mobile device 690 may be a smartphone, tablet, laptop computer, access point, or any other such device capable of connecting with the electronic eyewear devices 100 or 200 using both a low-power wireless connection 625 and a high-speed wireless connection 637. Mobile device 690 is further connected to server system 698 via a network 695. The network 695 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 642, image processor 612, low-power circuitry 620, and high-speed circuitry 630. The components shown in FIG. 6 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 645 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 642 to present the sequence of displayed images, including the initial displayed image with the initial field of view and the successive displayed image with the successive field of view.

As shown in FIG. 6, high-speed circuitry 630 includes high-speed processor 632, memory 634, and high-speed wireless circuitry 636. In the example, the image display driver 642 is coupled to the high-speed circuitry 630 and operated by the high-speed processor 632 in order to drive the left and right image displays 180C-D of the optical assembly 180A-B. High-speed processor 632 may be any processor capable of managing high-speed communications and operation of any general computing system needed for electronic eyewear device 100 or 200. High-speed processor 632 includes processing resources needed for managing high-speed data transfers on high-speed wireless connection 637 to a wireless local area network (WLAN) using high-speed wireless circuitry 636. In certain examples, the high-speed processor 632 executes an operating system such as a LINUX operating system or other such operating system of the electronic eyewear device 100 or 200 and the operating system is stored in memory 634 for execution. In addition to any other responsibilities, the high-speed processor 632 executing a software architecture for the electronic eyewear device 100 or 200 is used to manage data transfers with high-speed wireless circuitry 636. In certain examples, high-speed wireless circuitry 636 is configured to implement Institute of Electrical and Electronic Engineers (IEEE) 802.11 communication standards, also referred to herein as WI-FI®. In other examples, other high-speed communications standards may be implemented by high-speed wireless circuitry 636.

Low-power wireless circuitry 624 and the high-speed wireless circuitry 636 of the electronic eyewear devices 100 and 200 can include short range transceivers (BLUETOOTH®) and wireless wide, local, or wide area network transceivers (e.g., cellular or WI-FI®). Mobile device 690, including the transceivers communicating via the low-power wireless connection 625 and high-speed wireless connection 637, may be implemented using details of the architecture of the electronic eyewear device 100 and 200, as can other elements of network 695.

Memory 634 includes any storage device capable of storing various data and applications, including, among other things, color maps, camera data generated by the left and right visible light cameras 114A-B and the image processor 612, as well as images generated for display by the image display driver 642 on the see-through image displays 180C-D of the optical assembly 180A-B. While memory 634 is shown as integrated with high-speed circuitry 630, in other examples, memory 634 may be an independent standalone element of the electronic eyewear device 100 or 200. In certain such examples, electrical routing lines may provide a connection through a system on chip that includes the high-speed processor 632 from the image processor 612 or low-power processor 622 to the memory 634. In other examples, the high-speed processor 632 may manage addressing of memory 634 such that the low-power processor 622 will boot the high-speed processor 632 any time that a read or write operation involving memory 634 is needed.

Server system 698 may be one or more computing devices as part of a service or network computing system, for example, that includes a processor, a memory, and network communication interface to communicate over the network 695 with the mobile device 690 and electronic eyewear devices 100 and 200. Electronic eyewear devices 100 and 200 may be connected with a host computer. For example, the electronic eyewear devices 100 or 200 may be paired with the mobile device 690 via the high-speed wireless connection 637 or connected to the server system 698 via the network 695.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 642. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 690, and server system 698, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 640, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 625 and 637 from the mobile device 690 via the low-power wireless circuitry 624 or high-speed wireless circuitry 636.

Extended Field-of-View Capture

When a user is viewing augmented reality (AR) content through the electronic eyewear device 100, the user may only see a small portion of a virtual scene since the display area may not cover the entire scene. For example, in a scene in which two people are in front of the user, the first person being directly in front and the second person being on the user's periphery, if the user enables an AR effect that adds a dog mask to any face in the scene, the user may see a dog face applied to the first person, but not to the second person since the second person is out of the display's field-of-view (FOV). However, the cameras 114A and 114B of the electronic eyewear device 100 has a wider FOV than the display 180D. As a result, the cameras 114A and 114B may capture the second person's face so that the dog mask could be applied to the entire captured image including the second person's face, even though the display 180D of the electronic eyewear device 100 cannot render the second person's face as the second person's face is outside the FOV of the display 180D of the electronic eyewear device 100.

This feature allows the state of the AR feature (e.g., lens) to be captured, even if the AR feature is outside the FOV of the display 180D. Since one or more wide-FOV cameras 114A and 114B may be used to capture the real-world image, the wide-FOV recorded state of the AR feature may be re-composited after capture with the wide-FOV real-world image. The resulting composite image shows the AR feature that the user saw in the moment captured over a very wide FOV. In this example, the user would have access to an image capture where both the first and second person have dog masks applied to their faces. However, the user may have to move his or her head to change the display presentation to see the other portions of the wide FOV image (with AR features applied) that would otherwise be outside the small FOV of the display 180D of the electronic eyewear device 100.

To implement this feature, the electronic eyewear device 100 may capture a picture or a video having a large FOV of the content of the physical world that is in front of the user, thus capturing the user's point of view. The picture may be a still picture taken with one or more of the cameras 114A-B, and the video may be a two-dimensional or three-dimensional video image taken by one or more of the cameras 114A-B. The captured image may represent what the user sees in the real-world at any point in time and may be presented to the user's display 180A-B. On the other hand, the display 180A-B may show only augmented reality content or may show the real-world image augmented with lenses or other augmented reality features. When augmented reality content is present on the display 180A-B, the augmented reality content may be captured along with the real-world content so it can be re-composited later.

Figure 7A:
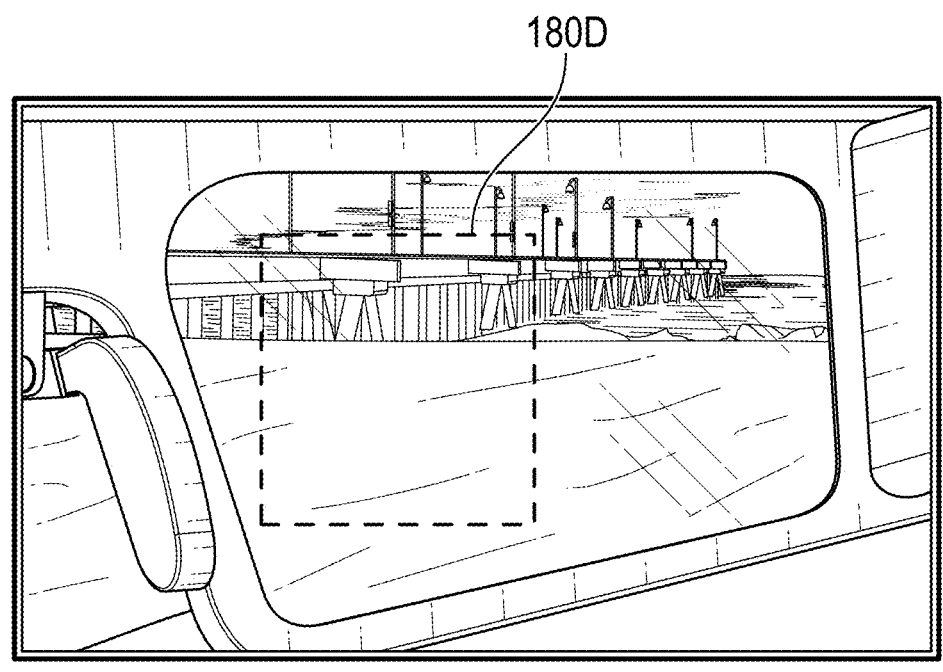
FIG. 7A illustrates a sample image as seen through the right optical assembly including the small field of view display portion.

A sample image as seen through the right optical assembly 180B including the small field of view display 180D is shown in FIG. 7A. During operation, the user may press a physical button on the eyewear device 100 or may provide a voice command that is interpreted to request the capture of a photo or a video of a set length (e.g., 10 seconds). For example, the duration of time that the physical button is pressed may indicate whether the user desires a photo (e.g., short button press, less than 0.6 second) or a video (e.g., longer button press). If the electronic eyewear device 100 is already recording, the physical button may be pressed again or the voice command provided again to extend the current recording by an additional period of time (e.g., 10 seconds). The video duration may be limited to a set duration (e.g., 60 seconds). On the other hand, if the electronic eyewear device 100 is already recording, the user can press and hold the button or issue a voice command to end the video immediately.

Figure 7B:
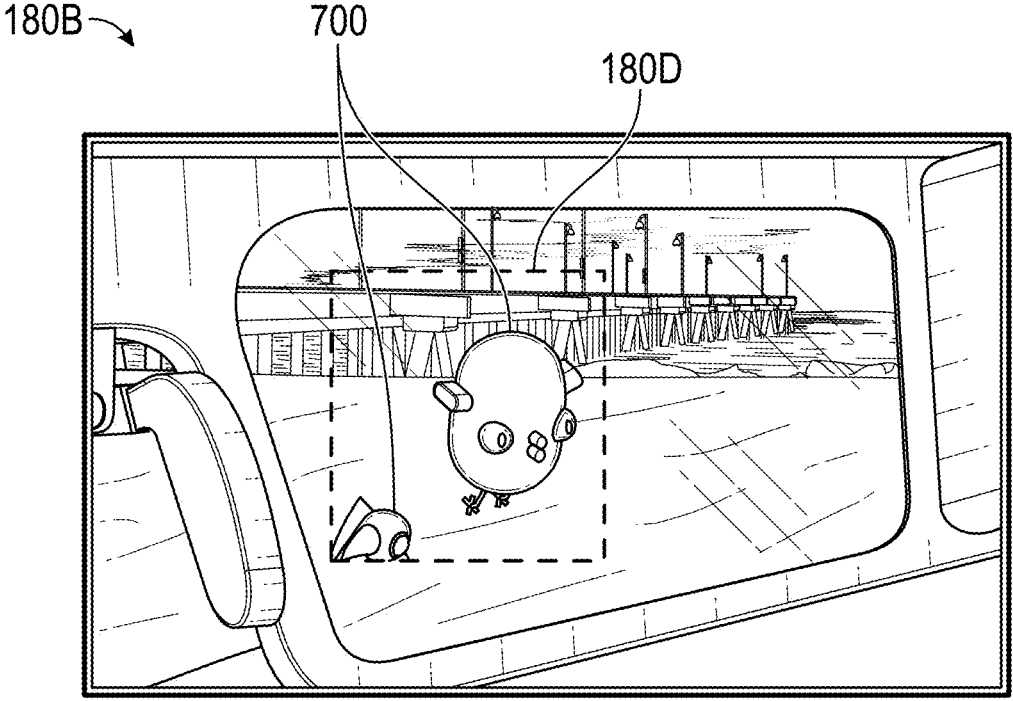
FIG. 7B illustrates the presentation of augmented reality objects to the display of the optical assembly of the electronic eyewear device where the augmented reality objects are limited to the small field of view display portion of the optical assembly.

FIG. 7B illustrates the presentation of augmented reality objects 700 to the display 180D of the optical assembly 180B. As illustrated, the augmented reality objects 700 are limited to the small FOV display 180D of the optical assembly 180B, so the remainder of the optical assembly 180B does not include the augmented reality objects 700.

In sample configurations, if the electronic eyewear device 100 has a Quick-Preview feature that is toggled ON, immediately after capture the user may see a post-capture preview of the photo or video. However, if the Quick-Preview feature is toggled OFF, immediately after capture the user may see an active notification with a thumbnail for the photo of video. In both modes, every photo or video that the user captures may be saved unless the user deletes the photo or video manually during the Quick-Preview.

In sample configurations, the electronic eyewear device 100 may be configured to enable the user to play back the captured video including augmented reality features or objects 700 in stereo 3-D. In this case, the user may capture the real-world scene using both physical cameras 114A and 114B. It will be appreciated that, in this case, the augmented reality content 700 would similarly need to be captured using two virtual cameras at the same FOV and placement as the physical cameras. The augmented reality capture may only include designated layers (e.g., just the lens content and not the user interface). The user may be enabled by the electronic eyewear device 100 to perform the Quick-Preview while simultaneously acting on the captured photo or video shown on the display 180D.

Figure 7C:
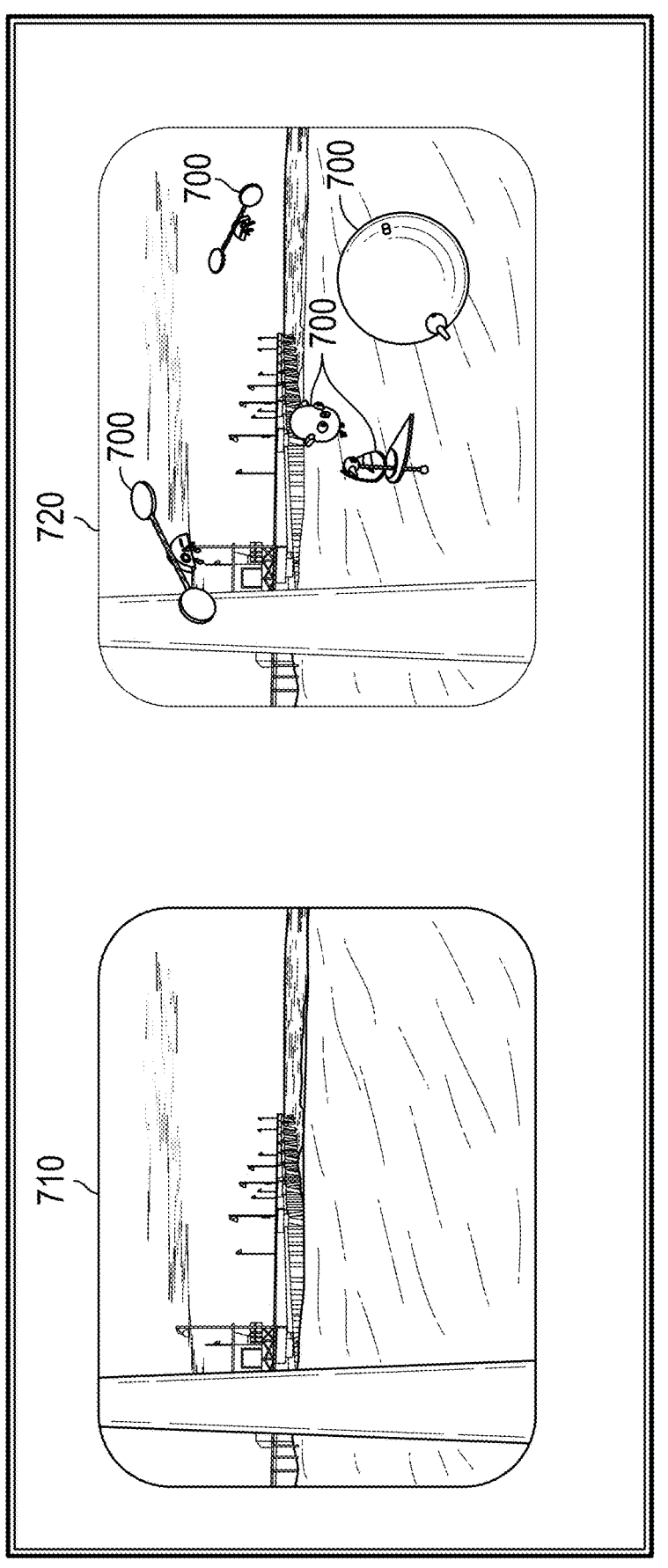
FIG. 7C illustrates the captured raw video and augmented reality feature metadata files captured for an image displayed within the electronic eyewear device with augmented reality features.
Figure 7D:
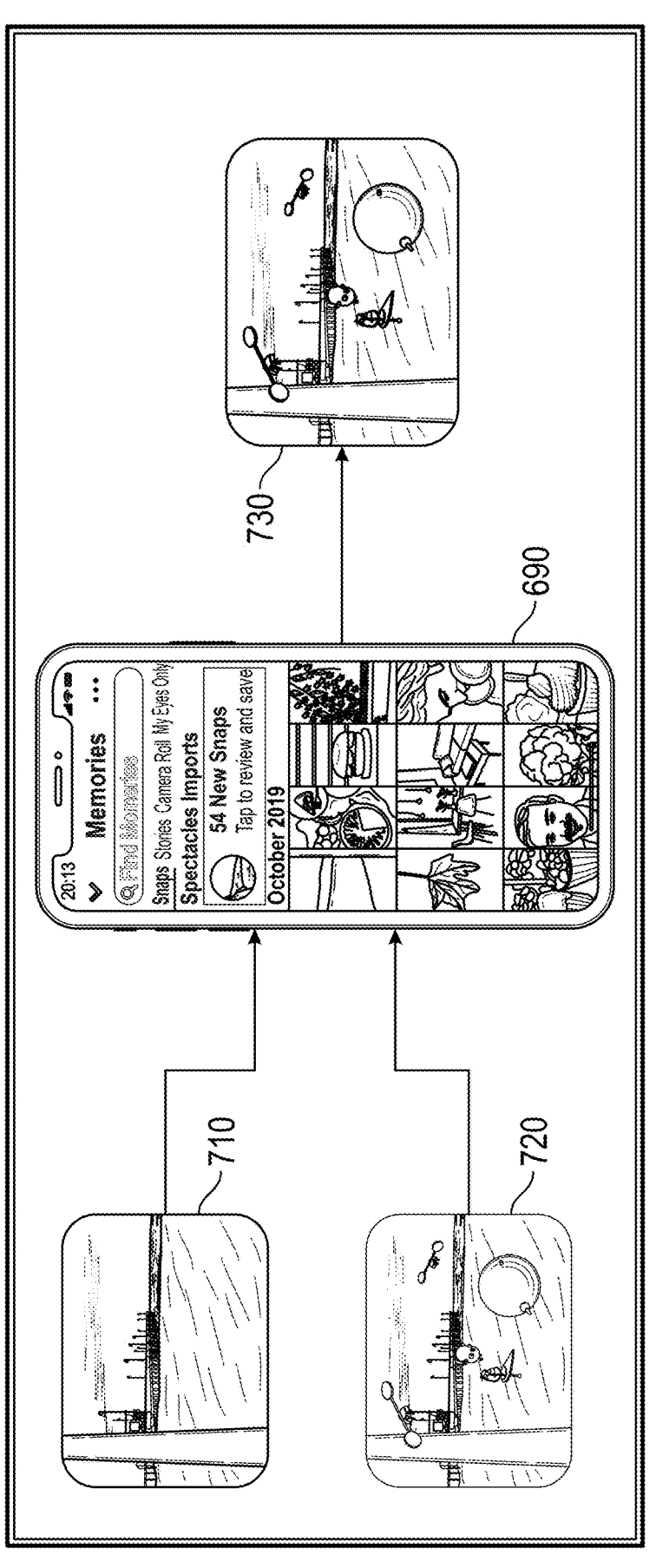
FIG. 7D illustrates a configuration where an image with augmented reality features is transferred to a user's mobile phone and composited in a communication application running on the user's mobile phone.
Figure 7E:
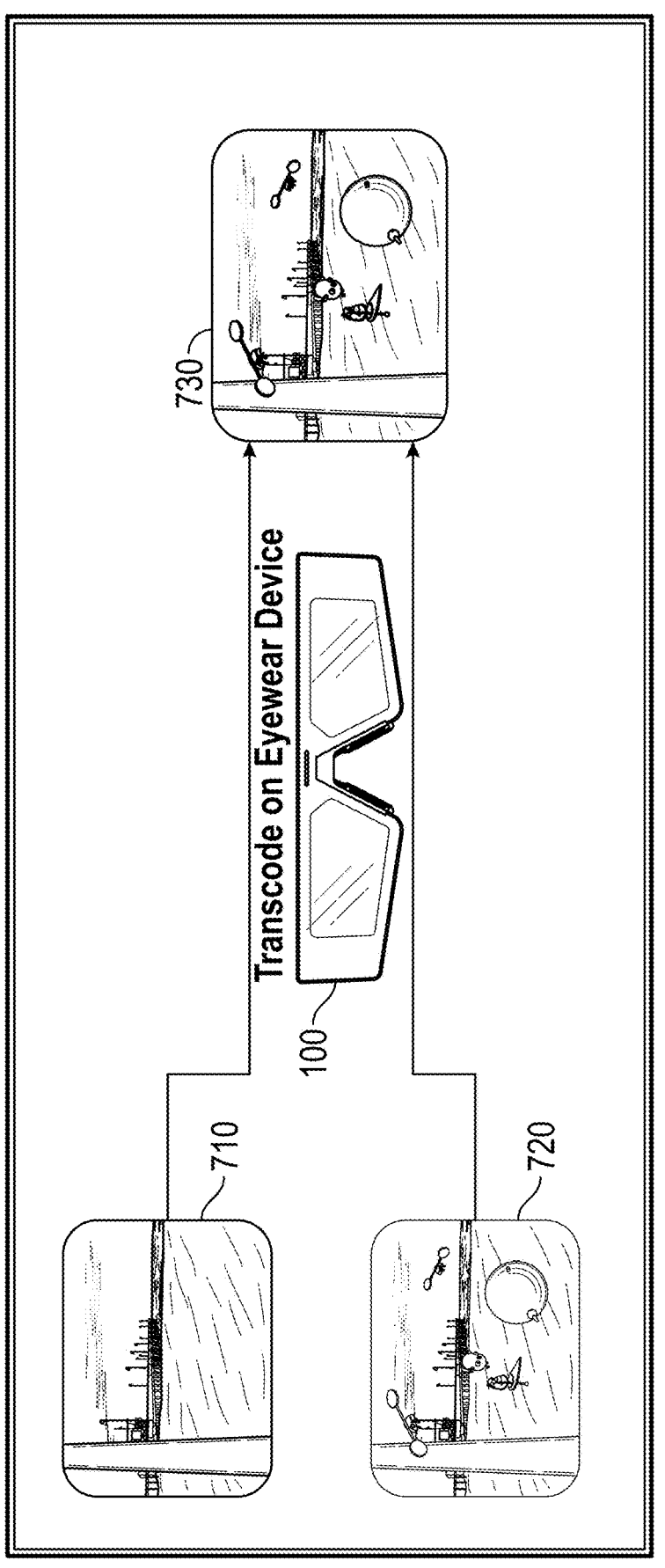
FIG. 7E illustrates a configuration where an image with augmented reality features is transcoded and composited on the electronic eyewear device to create a composited augmented reality image.

For images captured with augmented reality objects 700, a raw video 710 and an augmented reality feature (e.g., lens) metadata file 720 may be created as illustrated in FIG. 7C. If the user is connected to the user's mobile phone 690 (FIG. 7D), the raw video file 710 and augmented reality feature metadata file 720 may transferred and composited in a communication application such as SNAPCHAT® available from Snap, Inc., of Santa Monica, California to form as composited image 730 on the user's mobile phone 690. However, if the user's mobile phone 690 is not available, the raw video file 710 and the augmented reality feature metadata file 720 may be transcoded on the electronic eyewear device 100 to create the composited AR image 730 as shown in FIG. 7E. It will be appreciated that it is desired to transcode and composite the image on the user's mobile phone 690 or possibly in the back end server system 698, as possible, in order to conserve processor power to generate less heat and to save battery power on the electronic eyewear device 100. In this example, even though the display 180D only shows a limited portion of the captured scene with the augmented reality objects 700, the composited AR image 730 may be formed to include the entire large FOV image from the cameras 114A-B as well as the entire array of augmented reality objects 700 available for the scene.

Figure 8A:
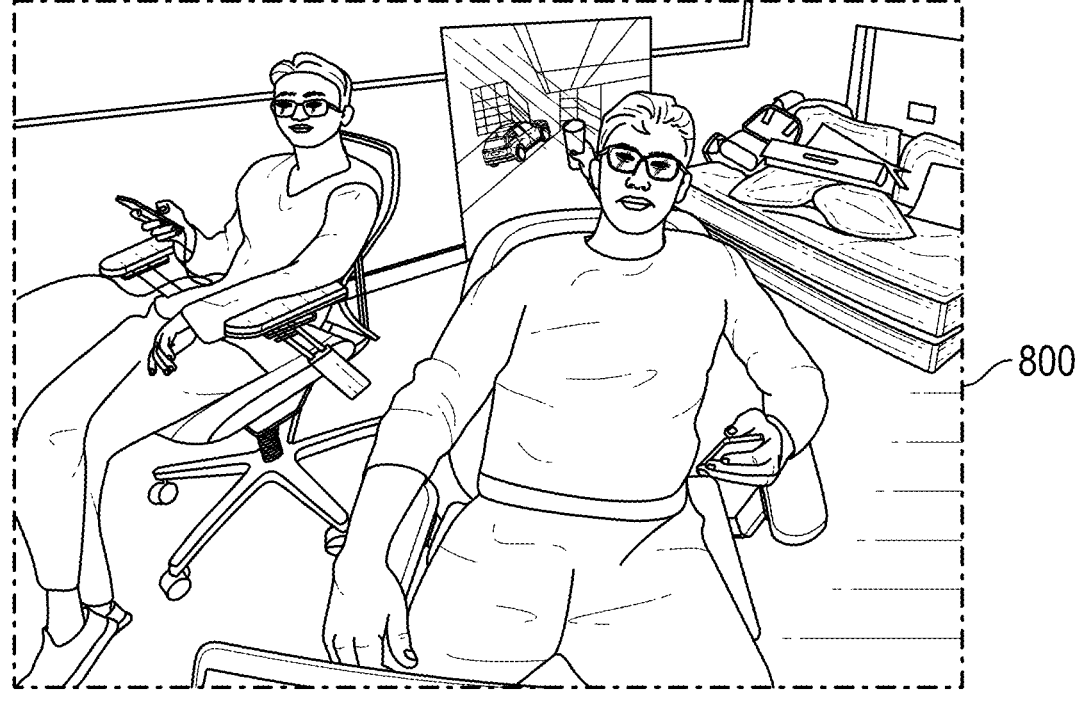
FIG. 8A illustrates a capture of a real-world scene including two persons with a large field of view camera.
Figure 8B:
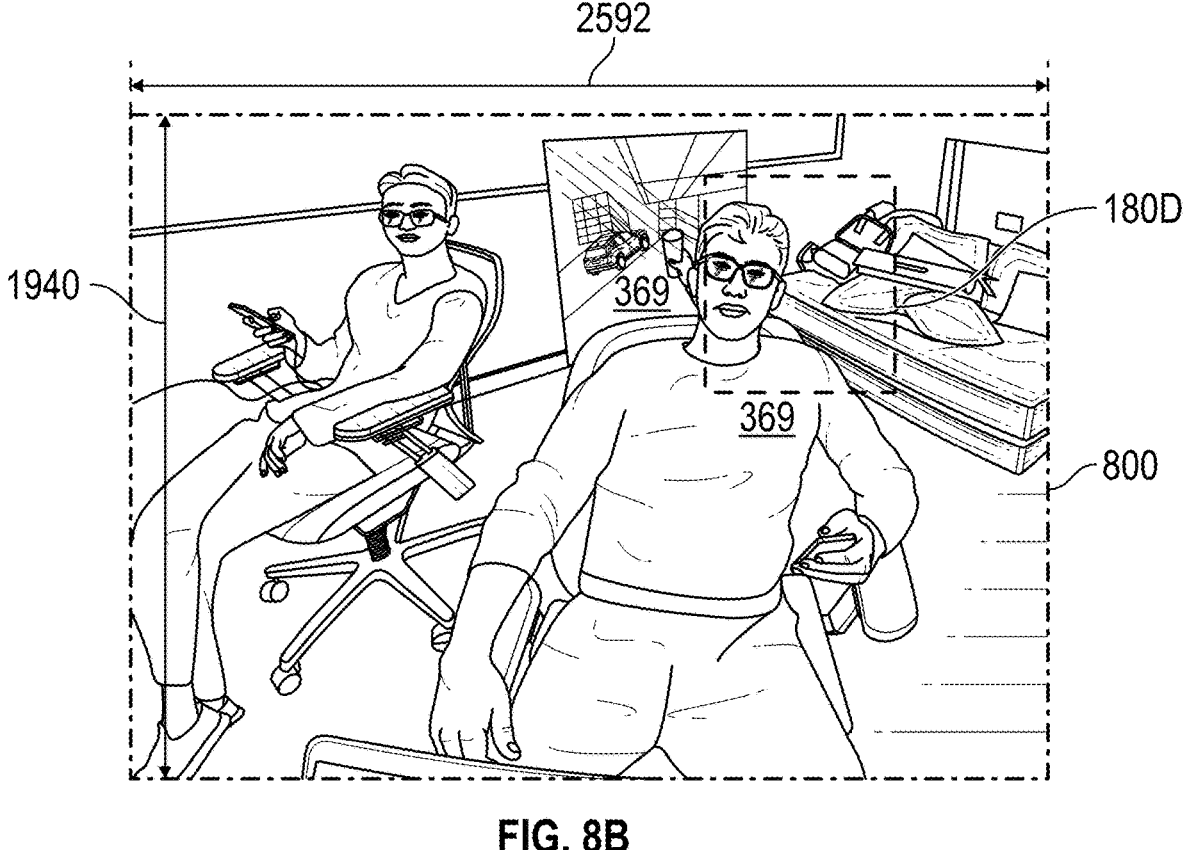
FIG. 8B illustrates that the small field of view display of the electronic eyewear device may display only a small portion of the captured large field of view image.
Figure 8C:
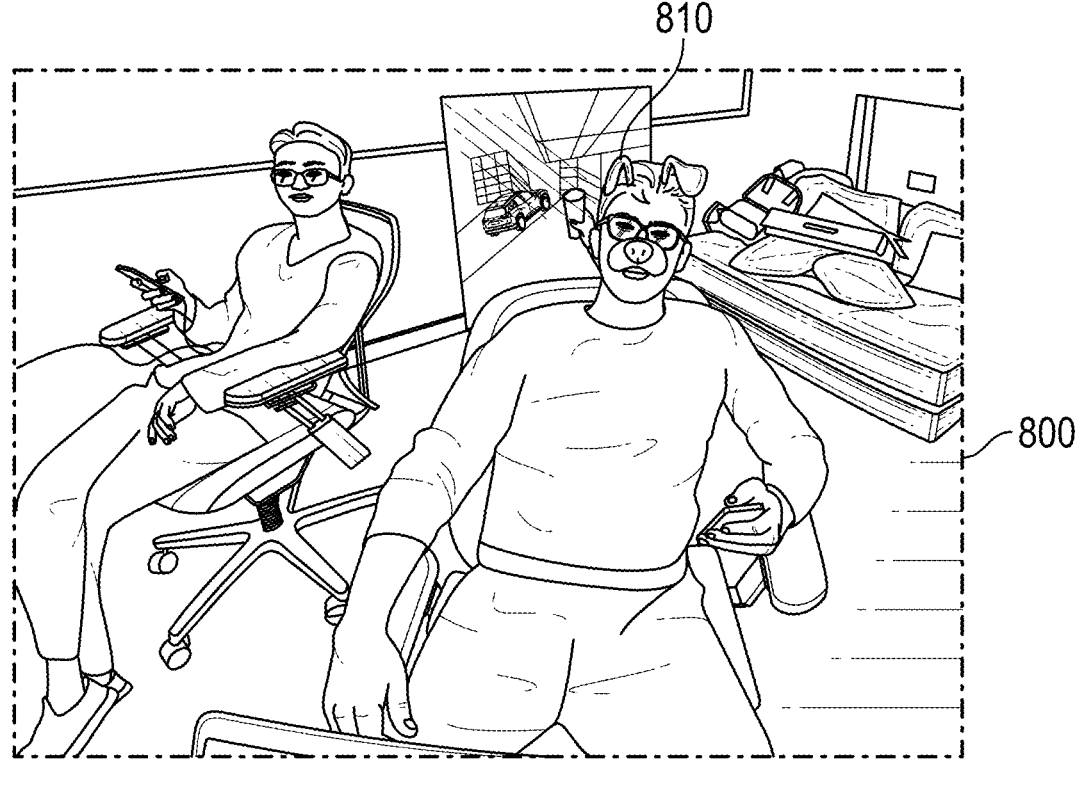
FIG. 8C illustrates a lens including the features of a dog applied to the face of only the person within the small field of view display.
Figure 8D:
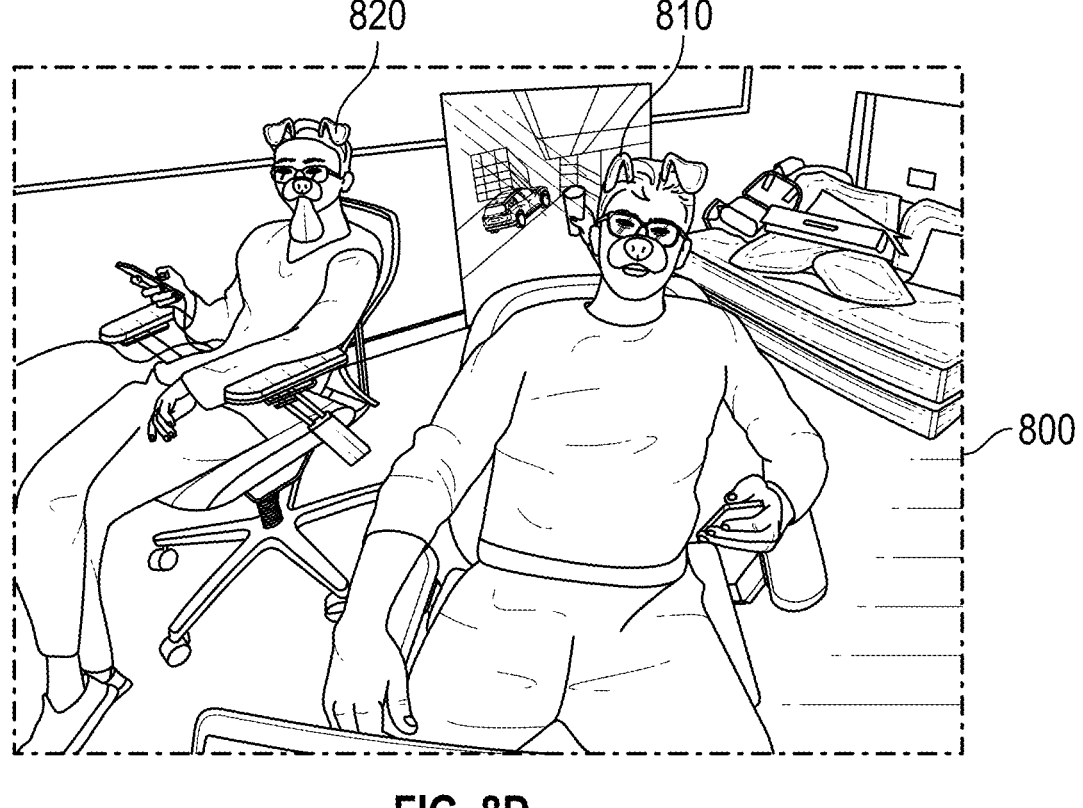
FIG. 8D illustrates a lens including the features of a dog applied to the large field of view image whereby the lens is applied to all faces in the image, even those outside the small field of view display.

In other configurations, a user of the electronic eyewear device 100 may scan a scene to identify objects and to select augmented reality features from an augmented reality feature storage for display on the real-world image viewed through the electronic eyewear device 100. For example, a real-world scene 800 may be captured as shown in FIG. 8A. As shown in FIG. 8B, the display 180D may display only a small portion of the large FOV image 800. In the example of FIG. 8B, the display 180D may only display a 369 by 369 pixel portion of the 1940 by 2592 pixel image captured by the large FOV cameras 114A-B. Typically, if the user wishes to apply augmented reality lenses to the captured image, the augmented reality lenses would be selected based on the objects in the display 180D and applied to the objects in the portion of the real-world image that is shown in the display 180D. For example, as shown in FIG. 8C, a face may be recognized that is captured in the display 180D and an augmented reality lens 810 applied (in this case, the features of a dog). As indicated, an augmented reality lens 810 is not applied to the face of another person in the scene because the other person is not within the display 180D. However, in a sample configuration using the entire captured large FOV image, the captured large FOV image may be scanned to enable the user to receive the correct augmented reality feature (e.g., lens) at the right time to apply to all objects in the scene and not just the portions of the scene provided in the display 180D. In this example, the lens including the dog features 820 would be applied to the face of the second person as shown if FIG. 8D even though the second person may not appear in the display 180D. Since the augmented reality lens 820 has been applied to the second person, if the user moves his or her head to view the second person, the second person would appear with the augmented reality features 820, as the augmented reality features 820 would have already been applied to the entire captured large FOV image 800. Conversely, if the captured composited image is provided to a large FOV display, such as the display of the user's mobile device 690 or a computer, the entire large FOV display with the augmented reality features 810 and 820 may be viewed.

Figure 9A:
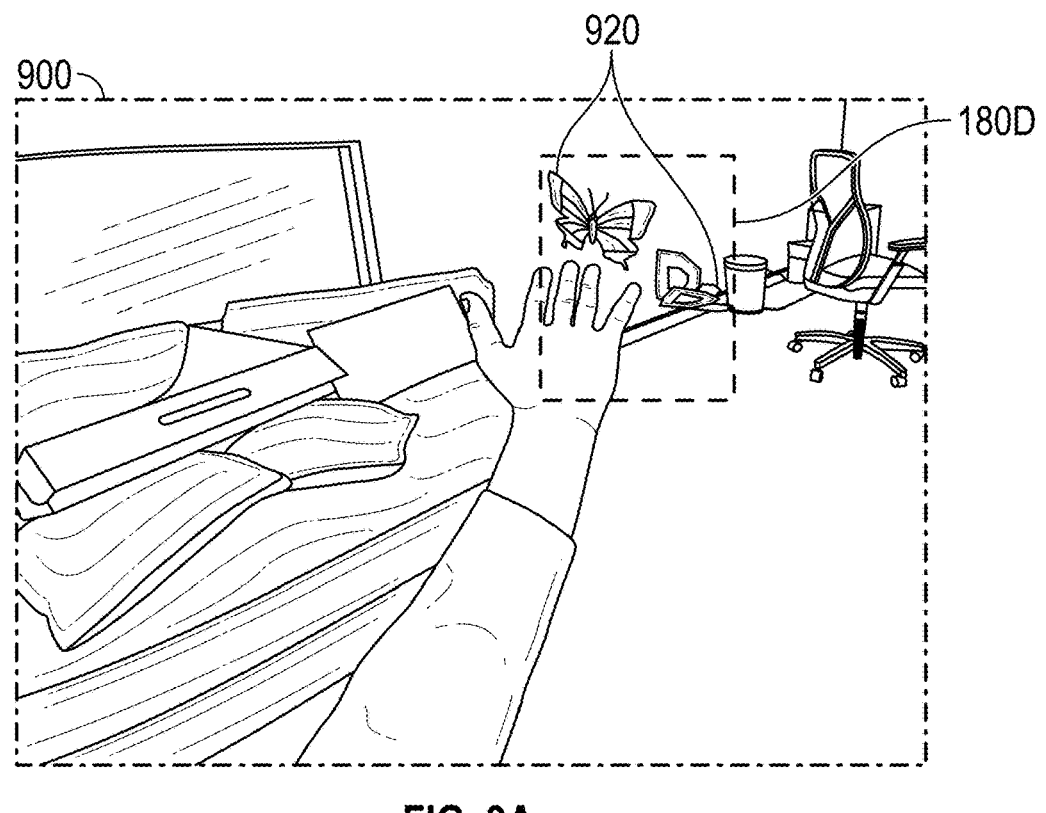
FIG. 9A illustrates a configuration in which the electronic eyewear device may recognize a hand in the captured scene and apply augmented reality features to the portion of the scene including the user's hand that is within the small field of view display.
Figure 9B:
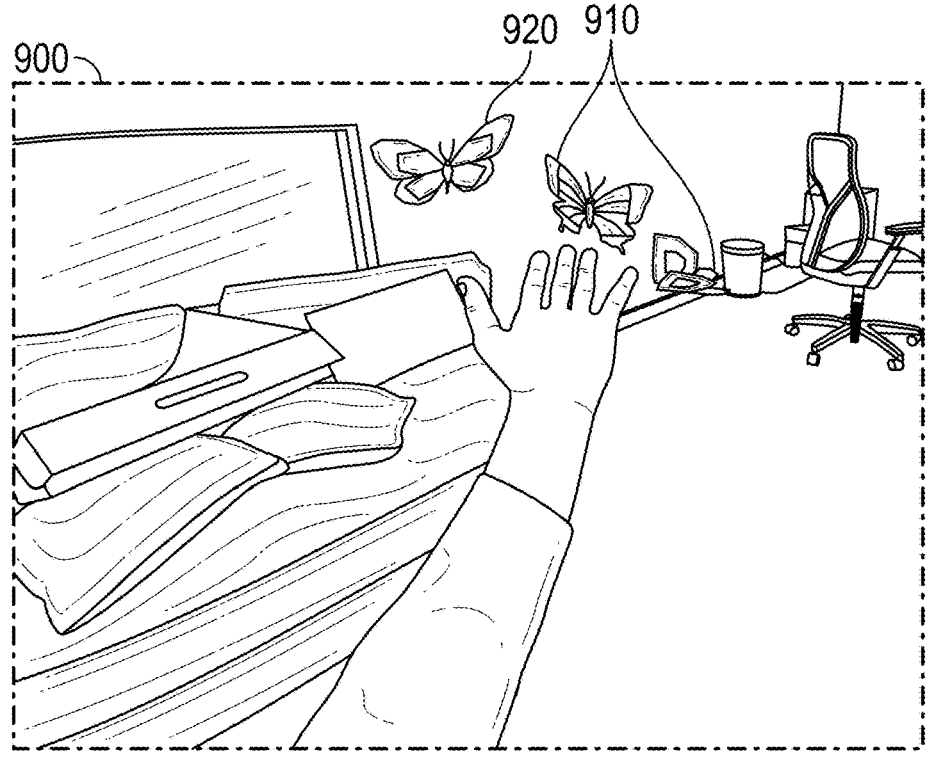
FIG. 9B illustrates a configuration in which the electronic eyewear device may apply additional augmented reality features to the portion of the large FOV scene including the user's hand, including the portions of the scene that were initially outside of the small field of view display.

In another sample configuration, the electronic eyewear device 100 may recognize a user's hand in the scene and apply augmented reality features. As shown in FIG. 9A, the electronic eyewear device 100 may recognize a hand in the captured scene 900 and apply augmented reality features 910 (e.g., butterflies) to the portion of the scene including the user's hand that is within the display 180D. However, in the event that the entire captured large FOV image is captured as described herein, the electronic eyewear device 100 may apply additional augmented reality features 920 to those areas of the captured large FOV scene that were initially outside of the display 180D, as shown in FIG. 9B. As in the example of FIGS. 8A-8D, if the composited image is provided to a large FOV display, such as the display of the user's mobile device 690 or a computer, the entire large FOV display with the augmented reality features 910 and 920 may be viewed.

FIG. 10 illustrates a sample flow chart 1000 for creating augmented reality images using large FOV images as described herein.

At 1010, the electronic eyewear device 100 requests a selected virtual or augmented reality object or feature to be applied to an image captured by the electronic eyewear device 100. For example, in the example of FIGS. 8A-8D the electronic eyewear device 100 would receive a request to transfer the lens of a dog face to each human face in the captured photo or video. At 1020, the selected augmented reality object or feature is applied to the large FOV image and the cameras 114A-B of the electronic eyewear device 100 capture a large FOV image that extends beyond the display 180D of the electronic eyewear device 100. The display

180D displays at 1030 the portion of the large FOV image with the selected augmented reality object or feature that fits within the small FOV display 180D of the electronic eyewear device 100. Since the augmented reality object or feature has been applied to the entire large FOV image, at 1040 the display 180D may be adjusted to view other augmented reality objects or features at the user moves his or her head to see other portions of the large FOV image with augmented reality objects or features that previously were not visible in the small FOV display 180D. Optionally, at 1050 the large FOV image with the augmented reality object or features may be transferred to another device with a larger field of view for viewing. For example, the large FOV image with the augmented reality object or features may be transferred to the user's mobile phone 690 for display. The user may zoom in or out on the image to enable selective viewing of the augmented reality objects or features applied to the large FOV image.

The systems and methods described herein thus permit augmented reality objects and features such as lenses to be applied to the entire field of view available to the electronic eyewear device 100, which is significantly larger than the field of view available to the display 180D of the electronic eyewear device 100. The augmented reality objects and features thus may be applied to the entire environment of the user for a more immersive experience. Also, recording of the captured scene enables viewing of everything in the scene that can be captured by the cameras 114A-B and rendered. Thus, the entire scene with all augmented reality features is available for playback.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
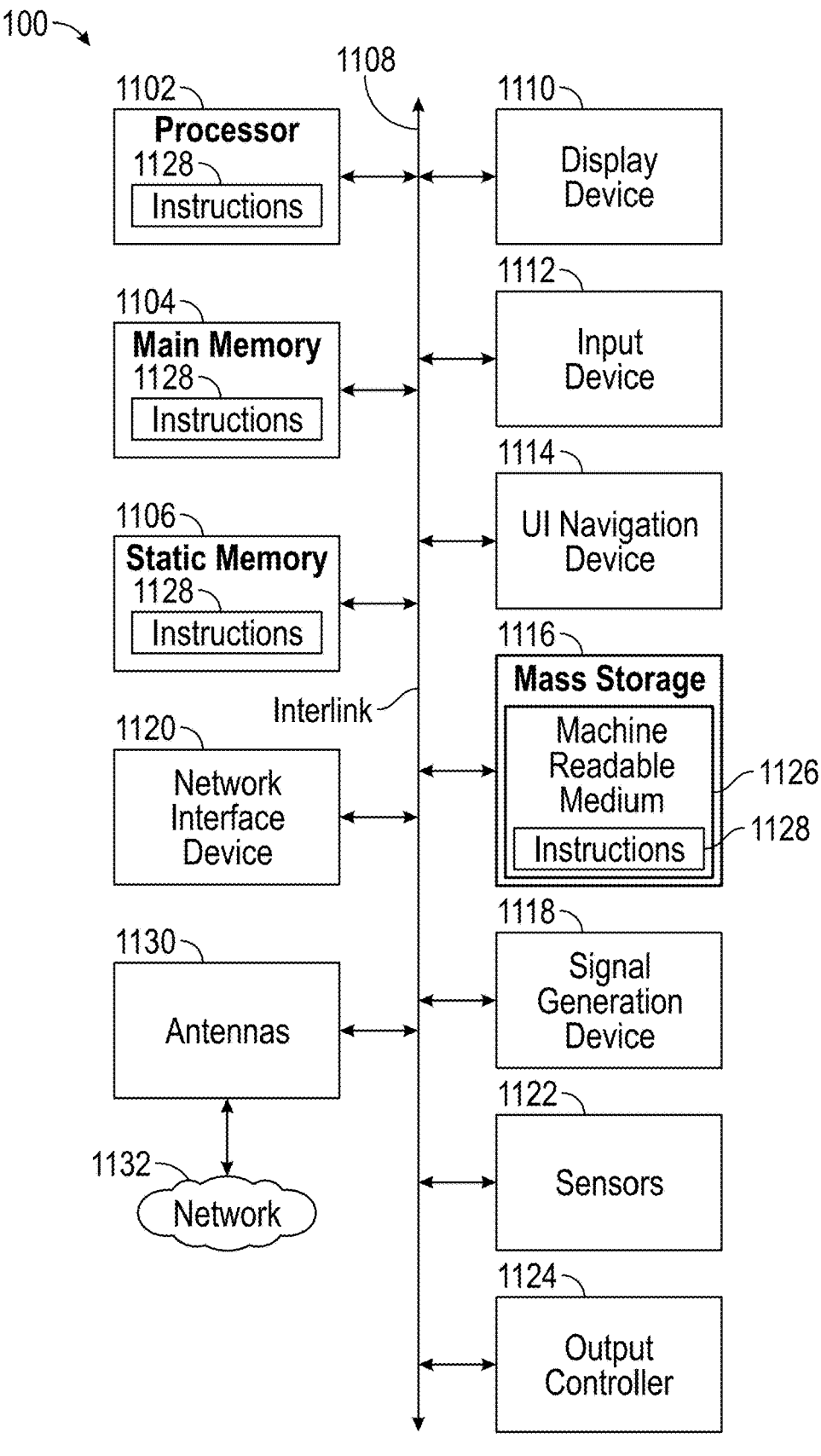
FIG. 11 illustrates a sample configuration of a computer system adapted to implement at least the backend server system in accordance with the systems and methods described herein.

By way of example, FIG. 11 illustrates a sample configuration of a computer system 1100 adapted to implement the backend services (e.g., voice-to-text or image processing services) in accordance with the systems and methods described herein. In particular, FIG. 11 illustrates a block diagram of an example of a machine 1100 upon which one or more configurations may be implemented. In alternative configurations, the machine 1100 may operate as a stand-alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample configurations, the machine 1100 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein by running the software used to implement the bots generated as described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 may include an output controller 1124, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., at least one of a centralized or distributed database, or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 720 or host computer of the service provider into the computer platforms of the client devices 810. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on the head of a user, comprising:
   a frame;
   at least one optical assembly within the frame;
   at least one display located within the optical assembly, the at least one display having a first field of view;
   at least one camera arranged on the frame to capture a scene in a viewing area around the user, the at least one camera having a second field of view that is larger than the first field of view of the at least one display and includes the first field of view and portions outside the first field of view;
   a memory that stores instructions; and
   a processor that executes the instructions to perform operations including:
   capturing a scene with the at least one camera having the second field of view;
   applying an augmented reality feature or object to the captured scene to create an augmented reality scene having the second field of view wherein the augmented reality feature or object is not visible in the first field of view;
   capturing a photo or video of the augmented reality scene having the second field of view;
   displaying a first portion of the captured photo or video in the at least one display having the first field of view; and
   transferring the captured photo or video to another device for viewing a second portion of the captured photo or video within the second field of view as the user moves the user's head to view the second portion of the captured photo or video, wherein the second portion includes the augmented reality feature or object that was not visible in the first portion of the captured photo or video.

2. The electronic eyewear device of claim 1, wherein the processor executes the instructions to perform additional operations including transferring the captured photo or video to a mobile phone for viewing.

3. The electronic eyewear device of claim 2, wherein the transferred captured photo or video comprises a photo or video of the captured scene having the second field of view and an augmented reality feature metadata file.

4. The electronic eyewear device of claim 1, wherein the processor executes the instructions to perform additional operations including compositing a photo or video of the captured scene having the second field of view with an augmented reality feature metadata file to form the augmented reality scene having the second field of view.

5. The electronic eyewear device of claim 1, wherein the processor executes the instructions to perform additional operations including presenting a preview of the captured photo or video of the augmented reality scene having the second field of view immediately after capture.

6. The electronic eyewear device of claim 1, wherein the processor executes the instructions to perform additional operations including presenting a thumbnail of the captured photo or video of the augmented reality scene having the second field of view immediately after capture.

7. The electronic eyewear device of claim 1, wherein the processor executes the instructions to perform additional operations including playing back the captured photo or video of the augmented reality scene having the second field of view in stereo 3-D, wherein the scene having the second field of view is captured by at least two cameras and the augmented reality feature or object is captured by at least two virtual cameras having a same field of view and placement as the at least two cameras.

8. The electronic eyewear device of claim 1, wherein the processor executes the instructions to perform additional operations including enabling a user to zoom in or out on the photo or video of the augmented reality scene having the second field of view to enable selective viewing of the augmented reality feature or object applied to the photo or video of the augmented reality scene having the second field of view.

9. The electronic eyewear device of claim 1, wherein the processor executes the instructions to perform additional operations including requesting the augmented reality feature or object for application to the scene.

10. A method of capturing augmented reality experiences of a user wearing an electronic eyewear device having a frame, at least one optical assembly within the frame, and at least one display located within the optical assembly, the at least one display having a first field of view, comprising:
   capturing a scene in a viewing area around the user with at least one camera on the frame, the at least one camera having a second field of view that is larger than the first field of view of the at least one display and includes the first field of view and portions outside the first field of view;
   applying an augmented reality feature or object to the captured scene to create an augmented reality scene having the second field of view wherein the augmented reality feature or object is not visible in the first field of view;
   capturing a photo or video of the augmented reality scene having the second field of view;

displaying a first portion of the captured photo or video in the at least one display having the first field of view; and transferring the captured photo or video to another device for viewing a second portion of the captured photo or video within the second field of view as the user moves the user's head to view the second portion of the captured photo or video, wherein the second portion includes the augmented reality feature or object that was not visible in the first portion of the captured photo or video.

11. The method of claim 10, wherein transferring the captured photo or video to another device for viewing comprises transferring the captured photo or video to a mobile phone for viewing.

12. The method of claim 10, wherein the transferred captured photo or video comprises a photo or video of the captured scene having the second field of view and an augmented reality feature metadata file.

13. The method of claim 10, further including compositing a photo or video of the captured scene having the second field of view with an augmented reality feature metadata file to form the augmented reality scene having the second field of view.

14. The method of claim 10, further including presenting a preview of the captured photo or video of the augmented reality scene having the second field of view immediately after capture.

15. The method of claim 10, further including presenting a thumbnail of the captured photo or video of the augmented reality scene having the second field of view immediately after capture.

16. The method of claim 10, further including playing back the captured photo or video of the augmented reality scene having the second field of view in stereo 3-D, wherein the scene having the second field of view is captured by at least two cameras and the augmented reality feature or object is captured by at least two virtual cameras having a same field of view and placement as the at least two cameras.

17. The method of claim 10, further including enabling a user to zoom in or out on the photo or video of the augmented reality scene having the second field of view to enable selective viewing of the augmented reality feature or object applied to the photo or video of the augmented reality scene having the second field of view.

18. The method of claim 10, further including requesting the augmented reality feature or object for application to the scene.

19. A non-transitory computer-readable storage medium that stores instructions that when executed by at least one processor cause the processor to capture augmented reality experiences of a user wearing an electronic eyewear device having a frame, at least one optical assembly within the frame, and at least one display located within the optical assembly, the at least one display having a first field of view, the capturing of augmented reality experiences comprising:

capturing a scene in a viewing area around the user with at least one camera on the frame, the at least one camera having a second field of view that is larger than the first field of view of the at least one display and includes the first field of view and portions outside the first field of view;

applying an augmented reality feature or object to the captured scene to create an augmented reality scene having the second field of view wherein the augmented reality feature or object is not visible in the first field of view;

capturing a photo or video of the augmented reality scene having the second field of view;

displaying a first portion of the captured photo or video in the at least one display having the first field of view; and transferring the captured photo or video to another device for viewing a second portion of the captured photo or video within the second field of view as the user moves the user's head to view the second portion of the captured photo or video, wherein the second portion includes the augmented reality feature or object that was not visible in the first portion of the captured photo or video.

20. The medium of claim 19, further comprising instructions that when executed by the at least one processor causes the processor to transfer the captured photo or video to a mobile phone for viewing.

* * * * *